United States Patent Office 3,010,786
Patented Nov. 28, 1961

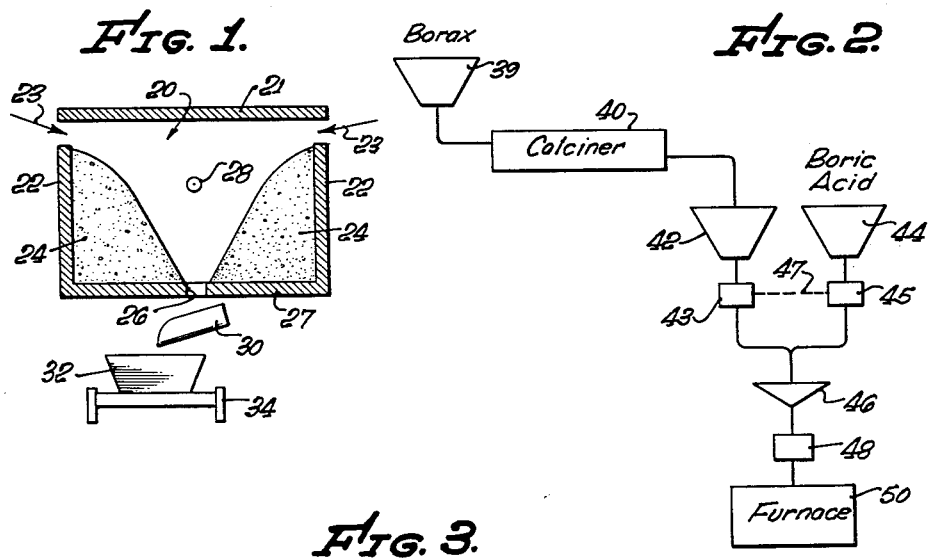

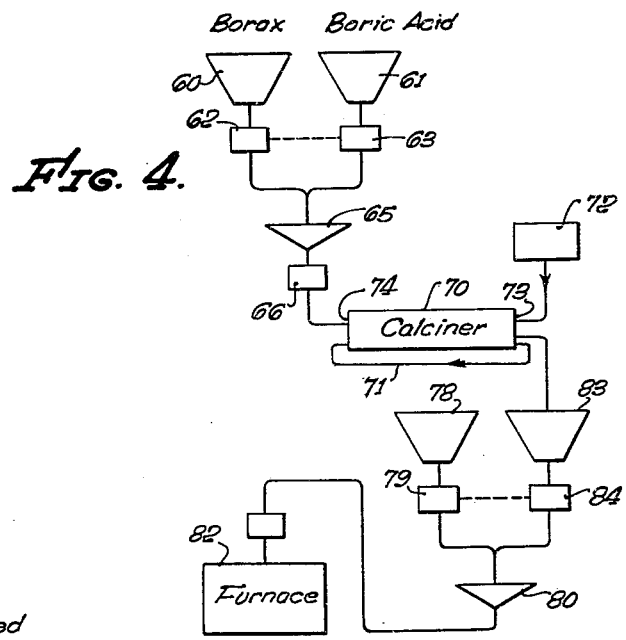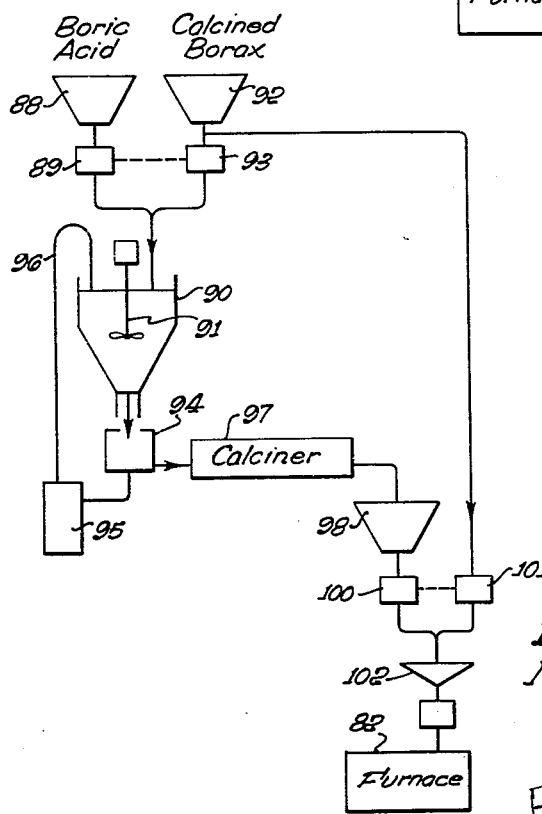

3,010,786
PRODUCTION OF SODIUM 1,5-BORATE
Donald S. Taylor, Whittier, and Nelson P. Nies, Laguna Beach, Calif., assignors, by mesne assignments, to United States Borax & Chemical Corporation, a corporation of Nevada
Original application May 23, 1955, Ser. No. 510,130, now Patent No. 2,886,461, dated May 12, 1959. Divided and this application Dec. 5, 1958, Ser. No. 778,449
2 Claims. (Cl. 23—59)

This invention has to do with the production of the crystalline sodium borate $Na_2O \cdot 5B_2O_3 \cdot 10H_2O$, which is commonly known as sodium pentaborate and which will be referred to herein as sodium 1,5-borate in accordance with the nomenclature recommended by the International Union of Chemistry.

The invention provides particularly convenient and economical procedures for producing sodium 1,5-borate for any desired purpose. The present invention is also capable of producing directly sodium 1,5-borate compositions that are especially satisfactory as furnace feed for the production of certain anhydrous sodium borate compositions. The production of such anhydrous sodium borate compositions, which are substantially crystalline and have a percentage content of $B_2O_3$ typically exceeding 80%, is more fully described and claimed in our copending patent application, Serial Number 510,130, filed May 23, 1955, now Patent No. 2,886,461, and entitled "Anhydrous Crystalline Borate and Process for Producing Same," of which the present application is a division. That parent application is a continuation-in-part of our copending patent application, Serial Number 348,672, filed on April 14, 1953, now abandoned.

In accordance with one aspect of the present invention, sodium 1,5-borate is typically produced by supplying boric acid and sodium 1,2-borate continuously to a rotary calciner to which a controlled stream of air is also supplied in a manner to be described.

In accordance with a further aspect of the invention, sodium 1,2-borate and boric acid are supplied substantially continuously to an aqueous slurry, and sodium 1,5-borate is crystallized from the solution phase of the slurry continuously at substantially constant temperature.

A full understanding of the invention and of its further objects and advantages will be had from the following description of certain illustrative manners of carrying it out. That description, of which the accompanying drawings form a part, is intended only as illustration, and not as a limitation upon the scope of the invention, which is defined in the appended claims.

In the drawings:

FIG. 1 is a schematic vertical section representing an illustrative furnace such as may be used for producing anhydrous sodium borate;

FIG. 2 is a schematic drawing representing an illustrative system in accordance with the invention;

FIG. 3 is a graph, representing the relative hygroscopicity of certain compositions plotted against percentage $B_2O_3$;

FIG. 4 is a schematic drawing representing a modified illustrative system in accordance with the invention; and FIG. 5 is a schematic drawing representing a further modification.

Furnace operation

As described in the above identified parent application, crystalline anhydrous sodium borate of the type described may be produced from a furnace melt that comprises as raw material a mixture of boric acid and a form of sodium 1,2-borate having less than the normal water content of 10 mols $H_2O$ per mol of sodium 1,2-borate.

Such a melt may be formed, for example, in a furnace of the type indicated partly schematically in FIG. 1. A furnace enclosure 20 comprises side walls 22, floor 27 and ceiling 21. The feed material may be introduced by any suitable conveyor and distributing means, not shown, at the top of the furnace side walls 22, as indicated by the arrows 23, and forms a bank 24 of solid material surrounding the furnace outlet, indicated at 26 in the floor 27 of the furnace enclosure. The slanting face of bank 24 is exposed directly to heat from an open flame within the furnace enclosure. That flame is typically produced by combustion of natural or artificial gas at a burner, indicated schematically at 28. Feed material is therefore continuously melted at the exposed face of bank 24, and flows down the sloping surface of the bank to furnace outlet 26. That outlet may be designed and operated in known manner to regulate within limits the temperature at which the melt is delivered from the furnace. That delivery is typically directed, as by the spout 30, to a series of relatively deep tray-like molds 32, which may be moved under the spout on any suitable conveying means, indicated at 34. In a furnace of that type the feed material typically remains solid at the upper portion of the sloping banks 24, being gradually heated as it moves down the banks, and starting to melt only after it has moved down the slope a considerable distance. It is therefore desirable that the feed comprise a composition that remains free-flowing during that initial heating stage.

If the feed material initially contains an excessive amount of water it is found that it may, under extreme conditions, become so fluid upon heating as to run down the furnace banks without becoming dehydrated. With more moderate excess of water, the feed material tends to form lumps and balls as the water is released with increasing temperature, impeding the free flow of the material down the furnace banks. That difficulty may be greatly reduced by utilizing a furnace feed having reduced water content.

Furnace feed: Boric acid and calcined borax

Such a furnace feed may comprise, for example, a mixture of boric acid and calcined borax. FIG. 2 represents in schematic form an illustrative system for providing such a furnace feed. Borax is delivered from a storage bin 39 to a suitable dehydrator, which is indicated at 40 as a conventional calciner. In actual practice any suitable type of dehydrating means may be employed, and the numeral 40 may, for example, represent a series of individual calciners, or any other known means of removing a large proportion of the water of crystallization of the borax. Calcined borax is delivered to surge bin 42 from dehydrator 40 preferably with a water content between 1 and 2 mols of water per mol of sodium tetraborate. The calcined borax is supplied via a suitable metering device, indicated schematically at 43, to the dry mixer 46. Boric acid from a storage bin 44 is similarly supplied via the metering device 45 to dry mixer 46. The two metering devices are regulated in suitable mutual relation, as indicated by the dashed line 47, to supply calcined borax and boric acid to the dry mixer in a predetermined proportion. The proportion of those ingredients is so determined, taking account of the average water content of the calcined borax produced by dehydrator 40, as to yield a mixture at the outlet of mixer 46 that has the desired average molar ratio. For example, if the borax is calcined to a water content of 1 mol, equal parts by weight of the calcined borax and boric acid provide a composition having an overall molar ratio of approximately 3.77; while the same proportions yield a molar ratio of about 3.92 if the calcined borax contains 2 mols of water. The mixture from mixer 46 is then supplied via any suitable conveying and metering means 48 to the furnace, indicated at 50.

By proportioning the boric acid and calcined borax to yield a molar ratio equal to about 3.85, for example, on the basis of the average water content of the calcined borax, such small irregularities in that water content as normally occur in calcined borax need not be constantly monitored by laboratory analysis and compensated by adjustment of the proportions of the two ingredients. Although such normal irregularities in water content may lead to corresponding variations in ratio of boric acid to anhydrous sodium 1,2-borate in the actual mixture produced, thus causing slight variations in the molar ratio of the furnace feed, that ratio will ordinarily remain within the preferred range between about 3.7 and 4.0, and will therefore not disturb proper operation of the process. In that manner it has been found to be possible to produce economically a very satisfactory product from an initial furnace feed comprising a simple mixture of boric acid and calcined borax.

*Furnace feed: Boric acid and sodium 1,2-borate pentahydrate*

Alternatively, the calcined borax at bin 42 may be replaced by crystalline sodium 1,2-borate pentahydrate. Such use of pentahydrate and boric acid has the advantage that both components of the mixture are definite crystals of uniform composition. For example, a mixture of one part sodium 1,2-borate pentahydrate and 0.807 part boric acid by weight leads conveniently to a uniformly reproducible furnace feed having molar ratio $B_2O_3/Na_2O$ of approximately 3.90, which is within the preferred range. Furnace feed of that illustrative type contains substantially 36.6% water. That figure, although it is very appreciably less than the 45.8% water content of a corresponding mixture of boric acid and ordinary borax, is high enough to require careful and continuous control of the rate of supply of the feed material to the furnace at such a value that the material moves uniformly down the furnace banks and becomes fully dehydrated before reaching the furnace outlet. It is found preferable under most conditions of operation to employ a furnace feed composition containing less than about 30% water, such, for example, as a mixture of boric acid and calcined borax containing less than 2 mols of water per mol of sodium 1,2-borate.

*Hygroscopicity of product*

The resulting anhydrous and substantially crystalline product is friable and can readily be crushed to convenient granular form. The superior properties of the product with respect to absorption of water from the atmosphere are illustrated in FIG. 3. In that figure are plotted experimental data obtained for a variety of anhydrous sodium borates and for boric oxide, including both crystalline and glassy materials. The percentage content by weight of $B_2O_3$ is plotted as abscissa. The ordinates are plotted on a logarithmic scale and represent the percentage increase in weight of samples of the indicated materials when exposed to an atmosphere of approximately 52% relative humidity at room temperature for a period of ten days. All materials were in granular form and of a screen size to pass a 35 mesh Tyler screen and to be held on a 48 mesh screen.

The sharp increase of hygroscopicity with $B_2O_3$ content in the non-crystalline sodium borate materials throughout the range between 77.1% $B_2O_3$ (anhydrous sodium 1,3-borate) and about 86.5% $B_2O_3$ is clearly shown by curve A of FIG. 3. The amounts of water picked up by crystalline anhydrous sodium 1,2-borate and by crystalline anhydrous boric oxide (at left and right extremes of curve B) are more than double the amounts for the corresponding glassy materials. However, that relation is sharply and surprisingly inverted for anhydrous sodium 1,4-borate. That material in the form of crystal picks up only about one-fifth as much moisture from the atmosphere as the corresponding glass under the typical test conditions. In the case of sodium 1,3-borate, the crystalline and glassy materials show substantially equal hydroscopicities.

*Molar ratio of $B_2O_3/Na_2O$*

The invention not only utilizes the newly discovered low hygroscopicity of anhydrous crystalline sodium 1,4-borate, the unexpected nature of which is clearly illustrated in FIG. 3, but further makes use in a novel manner of the sharp dependence upon $B_2O_3$ content of the hygroscopicity of glassy anhydrous sodium borates. By working in the range of $B_2O_3$ content that corresponds to a molar ratio between about 3.7 and 4.0, the invention makes practical use of that relationship in the following way. As a melt having molar ratio in that range cools under the conditions already described, $Na_2O \cdot 4B_2O_3$ crystallizes and is removed from the liquid phase of the melt. The molar ratio of the remaining melt is therefore shifted progressively further away from the value (4.0) of the crystal formed. Any relatively small portion of that remaining melt that may ultimately form glassy rather than crystalline portions of the final integrated solid therefore necessarily has a molar ratio appreciably less than 4.0. Because of the sharp slope of curve A in FIG. 3, such glassy portions can at most contribute only a relatively small amount to the hygroscopicity of the overall integrated composition. For instance, with an initial furnace melt having the preferred molar ratio 3.85, and assuming, as a rather extreme example, that on cooling of such a melt only 85% of its $B_2O_3$ crystallizes as $Na_2O \cdot 4B_2O_3$, the remainder of the composition would have an average molar ratio of 3.19 and a corresponding percentage $B_2O_3$ content of 78.2%. That substantially corresponds to the composition of anhydrous sodium 1,3-borate, tending to facilitate crystallization of that substance. However, even if all of that remainder should form glass, it may be seen from FIG. 3 that the tendency of that fraction of the final physically integrated composition to absorb moisture would be only about one-half as great as would be the case if 15% of a composition of molar ratio 4.0 should fail to crystallize.

Moreover, a composition having a nominal molar ratio of 4.0 is likely, as has already been indicated, to include portions for which the ratio has a value appreciably above 4.0. Any such portions of furnace melt produce upon cooling a mixture of crystalline 1,4-borate and a glassy material for which the molar ratio is markedly displaced upward from 4.0. Such glassy material, as may be seen from FIG. 3, has a relatively great tendency to absorb water from the atmosphere. Glassy material of that type is effectively avoided in accordance with the parent invention, and the water absorption of any glass that may form is held to a minimum value, by maintaining the average molar ratio of the furnace feed less than 4.0 and preferably within the range between 4.0 and about 3.7.

*Elimination of boric acid*

It has been discovered further, that, whereas satisfactory results are obtainable with feed compositions of the type already described, it is preferable from the point of view of economical and uniform feeding and operation of the furnace, that the furnace feed be substantially free of boric acid. That is perhaps partly because of the relatively high water content of boric acid, but even partially or wholly dehydrated boric acid has been found to have a tendency to promote lumping of the feed on the upper part of the furnace slopes. It has been found that superior behavior is obtainable by utilizing as feed a composition consisting essentially of sodium 1,5-borate, either crystalline or partially or wholly dehydrated, and a sufficient quantity of a sodium borate having a $B_2O_3/Na_2O$ ratio less than 4 to provide the desired overall ratio of the composition. A preferred sodium borate for that latter purpose is sodium 1,2-borate. For example, a suitable feed composition in accordance with the present aspect of the invention comprises sodium 1,5-borate and sodium 1,2-borate in a ratio of 2 mols 1,5-borate to approximately 1 mol 1,2-borate. For a given total water content, a composition of that type, for example, gives appreciably better performance in the furnace than a corresponding mixture of boric acid and sodium 1,2-borate.

Reaction of borax and boric acid in calciner

One aspect of the present invention has to do with procedures for producing a furnace feed material of the type just described in a particularly economical and convenient manner. FIG. 4 illustrates schematically a typical system for carrying out one illustrative procedure of that type. Borax and boric acid are delivered from respective bins 60 and 61 in a definite proportion controlled, for example, by the metering devices 62 and 63, respectively. In preferred form of the invention, the ratio of those ingredients is so determined as to provide substantially 6 mols of boric acid per mol of sodium 1,2-borate, giving an overall molar ratio $B_2O_3/Na_2O$ of approximately 5, corresponding to the composition of sodium 1,5-borate. Alternatively, a larger proportion of borax may be used, as will be described below. Those ingredients are thoroughly mixed, as at 65, and are supplied at a controlled and relatively low rate of flow, as via the metering device 66, to a calciner, indicated schematically at 70. That calciner is supplied, by means indicated at 72, with a stream of air of accurately controllable volume and temperature. That air moves through the calciner in countercurrent flow with respect to the described feed mixture, entering at the discharge end 73 of the calciner at moderate temperature, and leaving at the feed end 74 of the calciner at relatively low temperature.

Calciner 70 is operated at relatively low temperature throughout, and particularly in the vicinity of the feed end. As an illustration, air may enter at 73 at a temperature of 200° to 300° F., and preferably leaves the calciner at 74 at a temperature within the range between about 85 and about 100° F. A relatively large volume of air is employed, approximating 200 cu. ft. per pound of material processed, that large volume making up for the relatively low moisture-carrying capacity of the air at the temperatures indicated.

Under the conditions described in the vicinity of the feed end of the calciner, it has been found that chemical reaction of the borax and boric acid to form sodium 1,5-borate can be readily initiated, and ordinarily is so initiated spontaneously. That reaction, as is well known, releases water in a theoretrical amount of 9 mols $H_2O$ per mol of 1,5-borate formed. If allowed to continue in a closed vessel, for example, that released water typically leads to a slurry, or even a solution, depending upon the temperature. An important feature of the present invention is that the conditions are so controlled that the reaction proceeds at a moderate rate, and that a large fraction of the released water is evaporated as it is released. That is accomplished primarily by providing a relatively rapid flow of air at a moderately low temperature. The volume of air is limited sufficiently that a controlled amount of released water is permitted to accumulate, sufficient to make the entire granular mixture superficially damp. That superficial dampness is an important feature of the process, since it promotes the described chemical reaction. The rate of evaporation, on the one hand, must be sufficient to avoid too great wetness of the material which would tend to produce excessive agglomeration or balling of the material, reducing its effective surface area and further slowing evaporation.

On the other hand, the rate of evaporation must not be too great, for the mixture then may become so dry as to slow down the chemical formation of 1,5-borate. That would reduce the rate of release of water, and so tend further to increase the dryness.

The operation is thus carried out under conditions that are not inherently stable, but that tend, once they have been altered in either direction, to change further in that same direction. It has been found, however, that by careful control, particularly of the volume of air flow through the calciner, it is possible to maintain satisfactorily uniform conditions of operation. Those conditions, as already indicated, are such that the transformation of borax and boric acid to sodium 1,5-borate takes place gradually as the material moves through a damp zone of appreciable length, the released water being evaporated at such a rate as to maintain throughout that zone a condition of moderate superficial dampness. Moreover, as the material progresses through that damp zone the temperature of the air that it encounters, and also the temperature of the material itself, gradually increases. For example, the transformation to 1,5-borate typically starts in the immediate vicinity of the feed end of the calciner at a temperature of less than 100° F. and is not fully completed until the material has passed a considerable distance along the calciner, where it is exposed to air at a temperature of 120 to 150° F., for example. That higher temperature tends to insure complete reaction.

After the reaction has reached substantial completion, the surfaces of the sodium 1,5-borate particles become dry. The 1,5-borate may then be delivered from the calciner in surface-dry condition and still containing substantially the normal 10 mols of water per mol of 1,5-borate. Alternatively and preferably the calciner is of such length that the surface-dry 1,5-borate is retained in the calciner for a sufficient time to become calcined, losing a large fraction or even substantially all of its water of crystallization. In the preferred form of the invention, the moist zone in which the chemical reaction primarily occurs occupies roughly one-half of the length of the calciner, while the remainder of that length provides a zone of considerably higher temperature in which the dry 1,5-borate is calcined. At the discharge end of the calciner the 1,5-borate is typically exposed to air at a temperature of 200 to 300° F., for example, which is sufficient to reduce the remaining water content of the 1,5-borate to as little as 2 to 4 mols. Alternatively, temperatures higher than 300° F. may be employed for the last portion of the described operation. That is particularly convenient if the damp phase and the calcining phase of the operation are provided with separate air streams that are subject to independent control, as may be accomplished, for example, by the use of separate calciners for the two phases of the process. By the use of air temperatures in the neighborhood of 600° F. the finally delivered material may then be dried substantially completely, typically containing as little as 1% water, or about 0.25 mol $H_2O$ per mol 1,5-borate.

The product of that described operation is substantially sodium 1,5-borate, preferably considerably dehydrated. That product may be delivered via a surge bin 83 and metering device 84 to a dry mixer 80, to which is also supplied at an appropriate rate a sodium borate having molar ratio less than 4. As typically illustrated in FIG. 4, ordinary calcined borax is supplied from a storage bin 78 via a metering device 79, the proportion of borax to 1,5-borate being determined in accordance with their particular compositions to yield a composition in mixer 80 having an average molar ratio preferably somewhat less than 4.0 for the reasons already discussed. That mixture, typically comprising from about 1.3 to about 1.9 mols of sodium 1,5-borate per mol of sodium 1,2-borate, may then be supplied as feed material to the furnace, indicated schematically at 82.

Direct production of furnace feed in calciner

An alternative manner of operating a system of the above described type includes supplying the borax and boric acid to mixer 65 in a proportion to yield a composition having substantially the molar ratio desired for the furnace feed itself, preferably between about 3.7 and 4.0. That range of molar ratios corresponds to a mixture of borax and boric acid containing between 1.5 and about 1.8 mols of sodium 1,2-borate per 6 mols of boric acid, or between 0.5 and 0.8 mol excess over the 1.0 mol of 1,2-borate required to react with 6 mols of boric acid. The operation then proceeds substantially as already described, except that in calciner 70 there is an excess of borax beyond that required to react with all the boric acid. Bin 78, metering device 79 and dry mixer 80 may then be omitted, the calcined product from surge bin 83 being supplied directly via metering means 84 to the furnace. Under that manner of operation all of the boric acid is typically converted to sodium 1,5-borate in the damp phase of the operation, while from 33 to about 44% of the initial borax remains unreacted. During the calcining phase, both the remaining borax and the 1,5-borate produced by the reaction are dried to respective degrees dependent upon the particular conditions employed. A particular advantage of that manner of operation is that the mixture of borax and sodium 1,5-borate behaves particularly well during calcining, and can be made virtually completely anhydrous without difficulty. A further advantage of mixing borax and boric acid initially in the proportion required to give the final furnace feed is that the composition of both borax and boric acid is substantially uniform, and it is unnecessary to vary the weight ratio in which they are combined to compensate for variations in composition of the ingredients.

In a process of the type described in which sodium 1,5-borate is produced under conditions of only superficial dampness, it is found advantageous, although not necessarily essential, to provide more or less continuous seeding with crystals of 1,5-borate. That may ordinarily be accomplished to a sufficient extent when the operation is carried out, as illustratively described, in a calciner with counter-current air flow, since fine crystals of 1,5-borate formed by the process tend to be carried by the air stream toward the feed end of the calciner, where they act as seed crystals. Alternatively, a definite amount of the product may be removed from the calcining zone of the operation and recycled through the damp reaction zone. Such recycling of a portion of the product is indicated schematically at 71 in FIG. 4. That not only promotes the reaction, but facilitates removal of the released water.

Reaction of borax and boric acid as a slurry

A further modification of the invention is illustrated in FIG. 5. In the system there shown illustratively, boric acid and a suitable borate such as sodium 1,2-borate, for example, are fed in controlled proportions corresponding to sodium 1,5-borate to a tank 90 in which they are suspended in water to form an aqueous slurry. Constant agitation is provided by suitable means, indicated at 91, so that the added materials are held in suspension. Tank 90 is maintained at a suitable moderately elevated temperature, for example 100° F., at which borax and boric acid are decidedly more soluble than sodium 1,5-borate in solution saturated with respect to the latter. The added borax and boric acid then go into solution rapidly, the granules of those materials disappearing substantially as soon as they are introduced into the tank. That produces a solution appreciably supersaturated with respect to sodium 1,5-borate, causing the latter substance to crystallize out rapidly. Therefore, even when borax and boric acid are added steadily to the tank, the resulting slurry contains substantially no solid material except sodium 1,5-borate. The 1,5-borate is typically recovered continuously in any convenient manner, for example by centrifuging suspension withdrawn from the bottom of the tank, as indicated schematically at 94. The liquors from the centrifuge are typically returned via a storage tank 95 to tank 90, as indicated at 96. The damp crystals of sodium 1,5-borate recovered from the centrifuge are typically supplied directly to a calciner 97, in which any desired fraction of their water of crystallization is removed.

It is preferred to provide the sodium 1,2-borate to tank 90 in the form of calcined borax containing approximately 1 mol of water per mol of sodium 1,2-borate. A source of calcined borax of that type is represented schematically as the bin 92, from which the material is supplied to tank 90 via the metering device 93. The boric acid supply to tank 90 is typically shown as including a bin 88 and metering device 89, the two metering means 89 and 93 being operated under suitable related control, in the manner previously described. An important advantage of supplying the borax in highly calcined form is that the amount of water of hydration carried into tank 90 with the borate and boric acid is substantially equal to the water carried away from the tank as water of crystallization of the sodium 1,5-borate produced. The equation expressing that relation is here written as follows:

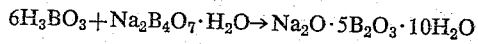

$$6H_3BO_3 + Na_2B_4O_7 \cdot H_2O \rightarrow Na_2O \cdot 5B_2O_3 \cdot 10H_2O$$

Accordingly, tank 90 is typically operated continuously in the manner described, producing sodium 1,5-borate crystals in a very convenient and economical manner, without requiring that any of the mother liquor be discarded or that water be evaporated in appreciable quantity.

In the illustrative operation described, the material delivered by calciner 97 is typically calcined sodium 1,5-borate. That material is satisfactory for use as the major component of a highly desirable furnace feed, a suitable amount of another sodium borate being added to it to provide the desired overall molar ratio. As illustratively shown, the output of the calciner is taken to surge bin 98, and is then supplied via metering device 100 to a dry mixer 102. Calcined borax is taken from the same bin 92 that supplies tank 90, and is supplied via a metering device 101 to mixer 102. The ratio of calcined 1,5-borate and calcined borax is controlled to give a mixture having the desired molar ratio, and that mixture is then typically supplied to the furnace, indicated schematically at 82. Alternatively, for example, the molar ratio of the product may be adjusted by adding another borate to the crystalline 1,5-borate before it reaches calciner 97. When that is done, regular crystalline borax can be used instead of calcined borax for adjusting the molar ratio, the mixture of borax and 1,5-borate then being calcined together. That procedure, again, has the advantage already mentioned in another connection that the two components of the mixture are both crystalline in nature, and subject to little or no variation in composition.

The systems illustratively shown in FIGS. 4 and 5 for producing suitable feed materials for production of anhydrous crystalline borate, and which utilize sodium 1,5-borate as one ingredient of such feed materials, are usable in part for the production of sodium 1,5-borate for conventional uses as well.

We claim:
1. The process for producing sodium 1,5-borate crystals, which process comprises the combination of adding substantially continuously to an aqueous solution in a vessel at a temperature of approximately 100° F. solid sodium 1,2-borate and boric acid in a molar ratio of substantially 1 to 6, continuously agitating the resulting mixture substantially without change of temperature to cause dissolution of the added solids and simultaneous crystallization of sodium 1,5-borate, withdrawing from the vessel substantially continuously and simultaneously with said addition a mixture of said solution and crystalline sodium 1,5-borate at substantially the said temperature, separating the crystals from said mixture, and returning the resulting solution to the vessel.

2. The process for producing sodium 1,5-borate crystals, which process comprises the combination of adding substantially continuously to an aqueous solution in a vessel at a temperature of approximately 100° F. solid sodium 1,2-borate containing substantially one mol of water per mol of sodium 1,2-borate and solid boric acid in a molar ratio of substantially 1 to 6, continuously agitating the resulting mixture substantially without change of temperature to cause dissolution of the added solids and simultaneous crystallization of sodium 1,5-borate, withdrawing from the vessel substantially continuously and simultaneously with said addition a mixture of said solution and crystalline sodium 1,5-borate, at substantially the said temperature, separating the crystals from said mixture, and returning the resulting solution to the vessel, the water carried into solution by dissolution of said solids substantially balancing the water carried out of solution by crystallization of the crystalline product.

References Cited in the file of this patent
UNITED STATES PATENTS

| | | |
|---|---|---|
| 2,032,388 | Allen | Mar. 3, 1936 |
| 2,097,411 | Corkill | Oct. 26, 1937 |
| 2,773,738 | Ball et al. | Dec. 11, 1956 |

OTHER REFERENCES

Mellor: "A Comprehensive Treatise on Inorganic and Theoretical Chemistry," vol. 5, page 76 (1924), Longmans, Green and Co.